Figure 1:
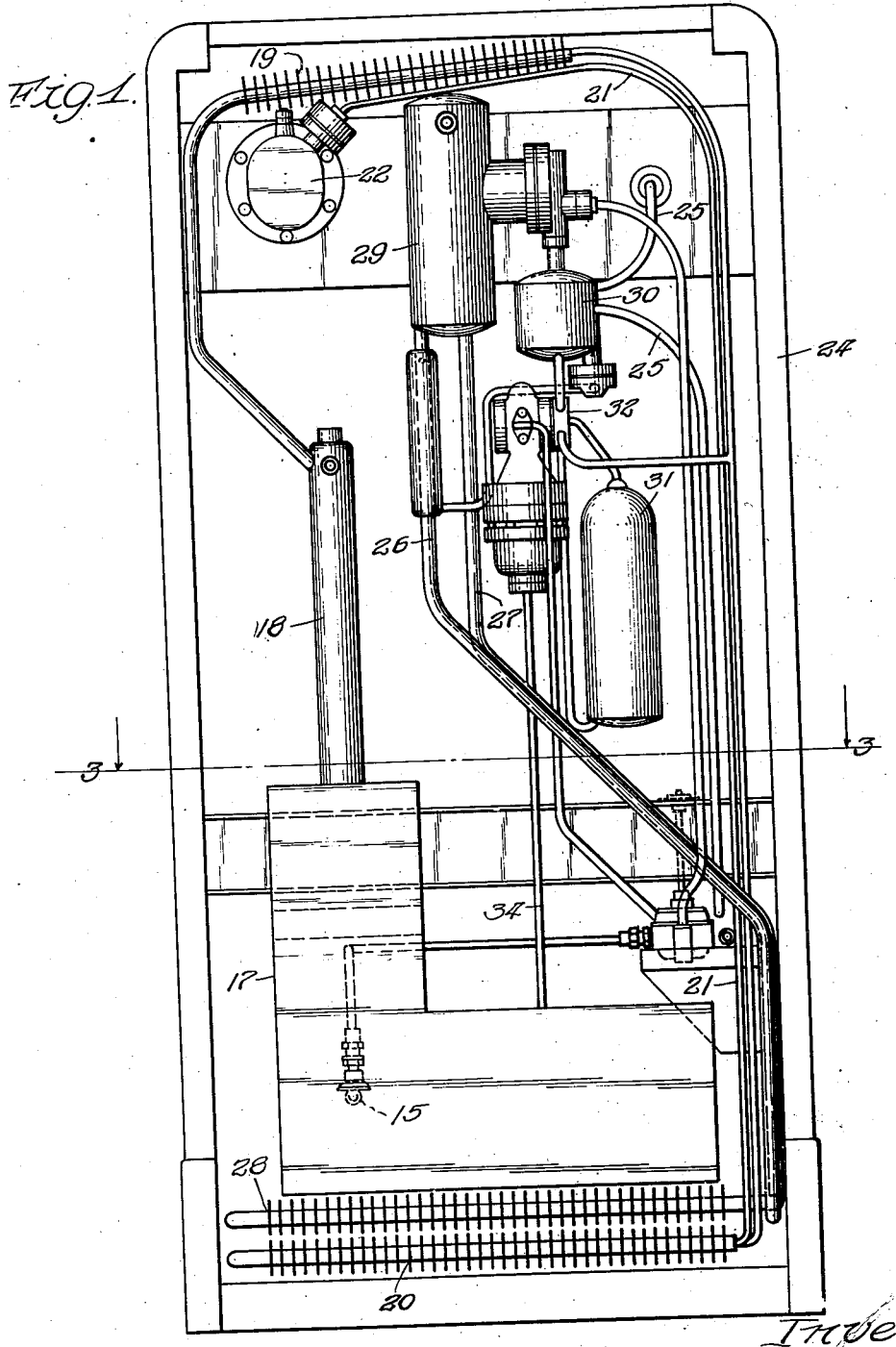

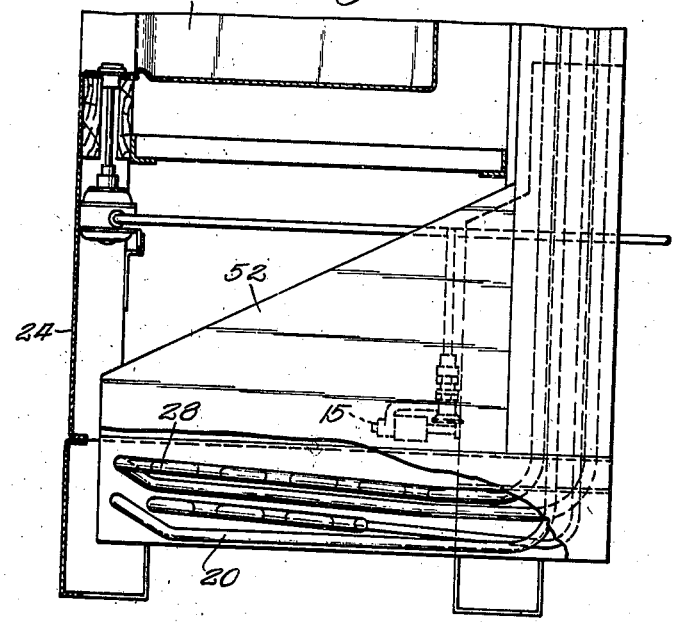
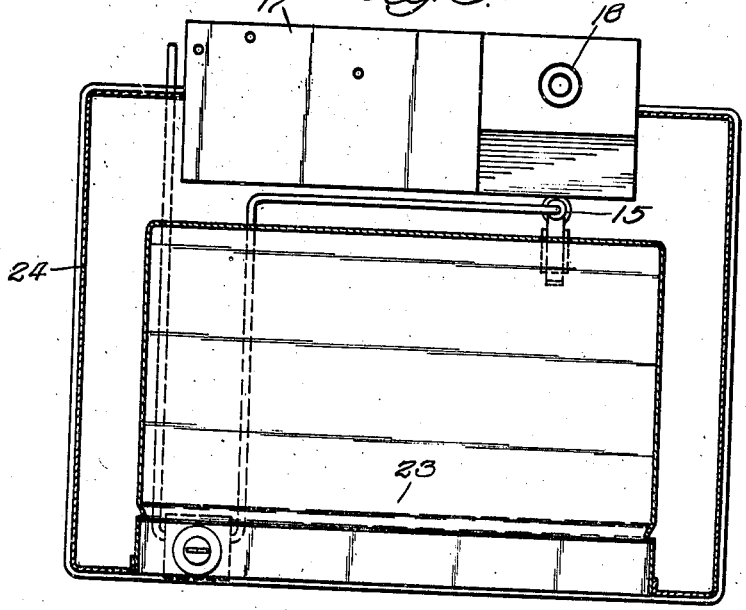

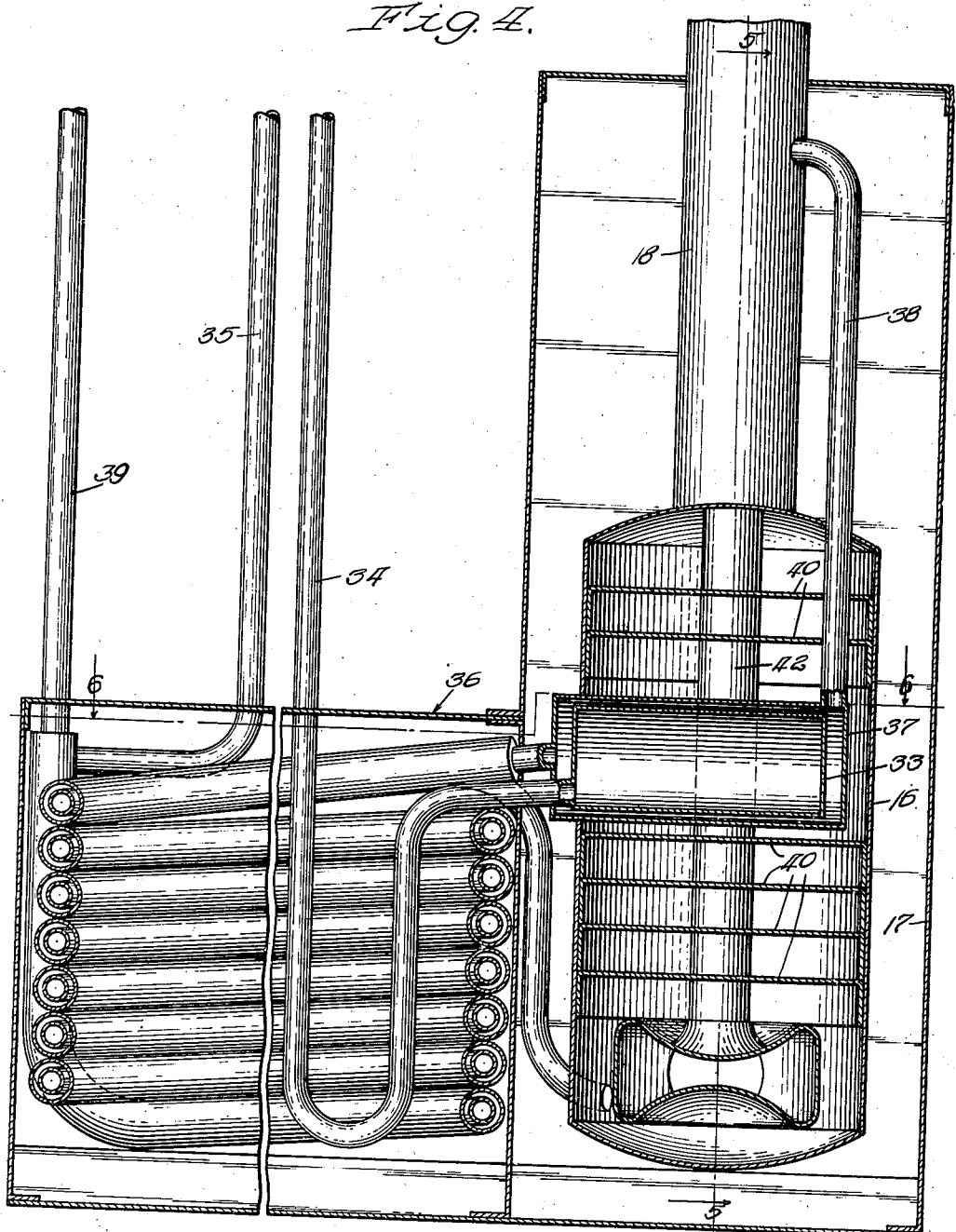

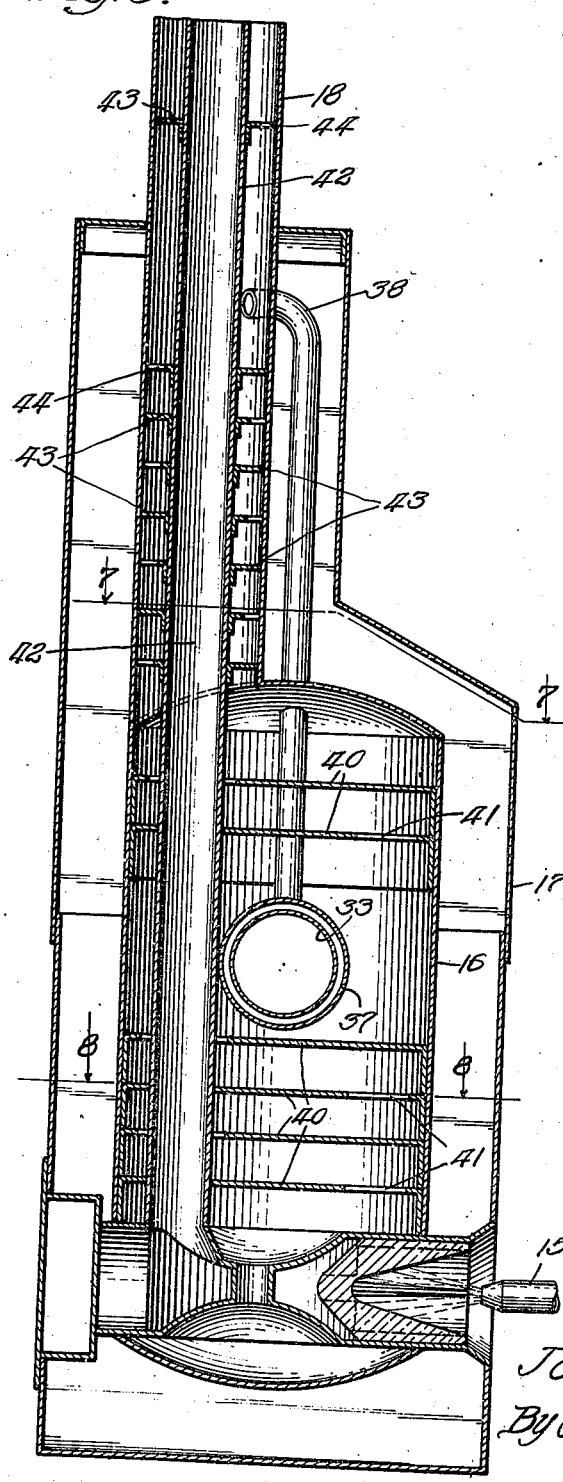

Jan. 25, 1944.    J. N. ROTH    2,339,817
ABSORPTION REFRIGERATOR
Original Filed Jan. 19, 1940    5 Sheets-Sheet 5
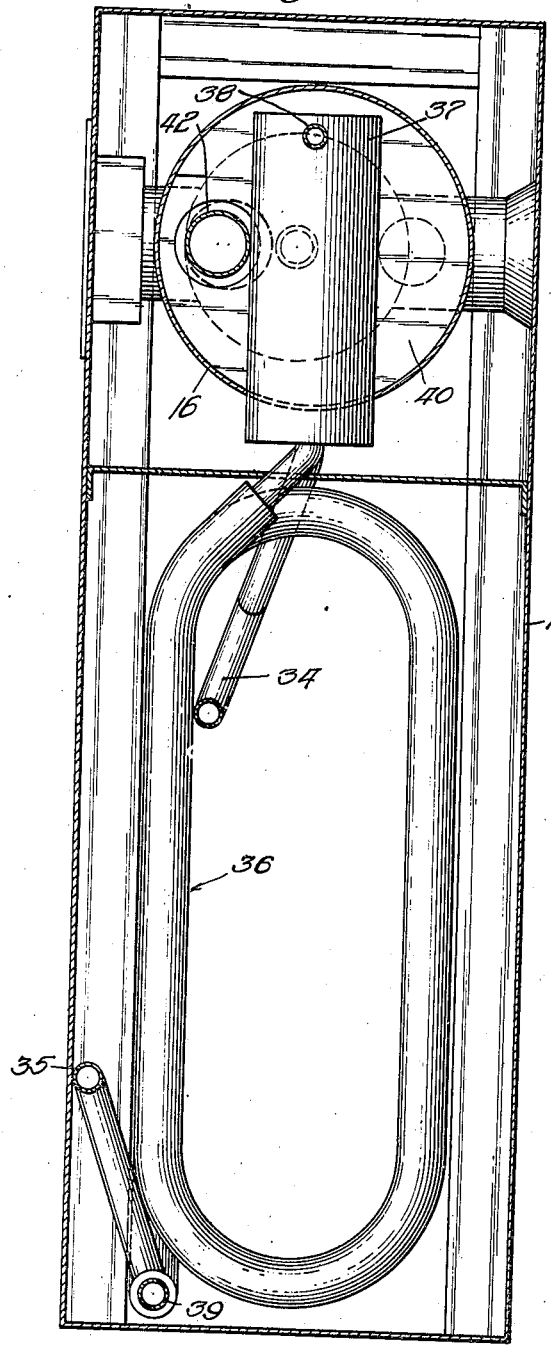
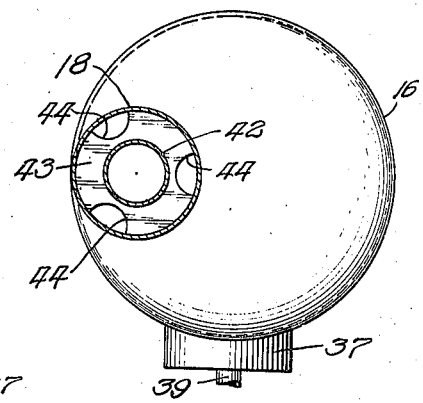
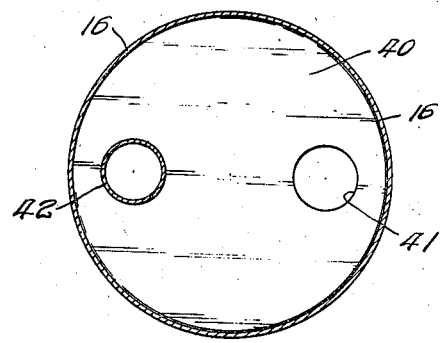
Inventor:
Joseph N. Roth,
By Chritton, Wiles, Davies & Hirschl
Attys.

Patented Jan. 25, 1944

2,339,817

UNITED STATES PATENT OFFICE 2,339,817

ABSORPTION REFRIGERATOR

Joseph N. Roth, Belding, Mich., assignor, by mesne assignments, to Gibson Refrigerator Company, Greenville, Mich., a corporation of Michigan Original application January 19, 1940, Serial No. 314,704. Divided and this application April 11, 1941, Serial No. 388,155

7 Claims. (Cl. 62—119)

This invention relates to an absorption refrigerator, and more particularly to a domestic refrigerator of the continuous absorption type.

One feature of this invention is that it provides improved and more efficient continuous absorption refrigeration apparatus of a size and arrangement adapted for an air-cooled domestic refrigerator; another feature of this invention is the provision of an improved still and vapor purifying apparatus, in the form of an analyzer tower; a further feature is the location of the analyzer and still to the back of and partly below the food compartment of the cabinet; yet another feature is the use of air-cooled condenser and absorber coils, and their location in the machinery compartment near the bottom of the cabinet; other features and advantages of the invention will be apparent from the following specification and the drawings, in which:

Figure 1 is a back elevation of a domestic refrigerator embodying my invention; Figure 2 is a partial vertical sectional view transverse to Figure 1; Figure 3 is a horizontal sectional view along the line 3—3 of Figure 1; Figure 4 is a vertical sectional view of the still and heat exchange apparatus; Figure 5 is a vertical sectional view of the still and part of the analyzer tower, along the line 5—5 of Figure 4; Figure 5A is a vertical sectional view of the remainder of the analyzer tower; Figure 6 is a horizontal sectional view along the line 6—6 of Figure 4; Figure 7 is a horizontal sectional view along the line 7—7 of Figure 5; and Figure 8 is a horizontal sectional view along the line 8—8 of Figure 5.

The refrigerator shown and described herein is a practical embodiment of a continuous absorption refrigeration system embodying a number of inventions by myself and one Ralph E. Schurtz, both solely and jointly, filed both earlier and later than this application, the earlier copending applications in this regard being: Serial No. 296,995, filed September 28, 1939; Serial No. 298,110, filed October 5, 1939; Serial No. 314,704, filed January 19, 1940; Serial No. 319,541, filed February 17, 1940; Serial No. 326,292, filed March 27, 1940; Serial No. 352,328, filed August 12, 1940; Serial No. 361,629, filed October 17, 1940; Serial No. 369,876, filed December 12, 1940; Serial No. 380,343, filed February 24, 1941; and Serial No. 382,420, filed March 8, 1941.

The present application is a divisional of my application Serial No. 314,704, filed January 19, 1940, and is particularly concerned with details of still and analyzer tower location and construction and absorber heat-dissipating coils near the bottom of the cabinet. Inasmuch as the general system of operation and other features and improvements therein are disclosed in considerable detail in the above co-pending applications, the general arrangement and operation will be only briefly described here.

In the particular embodiment of my invention disclosed herewith the flame from a burner 15 heats the liquor (comprising a refrigerant such as ammonia and an absorber such as water) in a still 16 within the casing 17 to boil off refrigerant vapor. This vapor is passed through an analyzer tower 18 and an air-cooled finned rectifier 19 to the condenser coils 20, where it is liquefied. The liquefied ammonia is forced up, by the vapor pressure behind it, through the tube 21 to the receiver 22. A float-actuated reduction valve then admits the refrigerant to an evaporator located in the food compartment in the upper part of the cabinet 24, where it expands into vapor to keep this food compartment cool.

The refrigerant, again in vapor form, then passes through a pipe 25 down to the rising leg 26 of a circulating coil comprising the legs 26 and 27 and the finned coil 28 at the bottom of the cabinet. This circulating loop is connected to an absorber chamber 29, and operates as part of the absorbing means. The refrigerant vapor is reabsorbed in this means, so that the loop and chamber contain relatively rich liquor.

Inasmuch as the absorber operates at a pressure in the neighborhood of ten to fifteen pounds and the still at a pressure of ten to twenty times this pressure, means are provided for withdrawing weak liquor at desired intervals from the still and supplying rich liquor thereto to maintain in the still a body of liquor of substantially constant volume and concentration; although, as will be described more fully hereafter, the concentration differs at different levels in the still at all times. This transfer apparatus comprises in general a pressure chamber 30, a transfer chamber 31, and transfer valve mechanism 32. A fluid thermostat bulb 33 in the still operates, through the liquid leg 34, to effect movement of the transfer valves at desired times.

As has been more fully brought out in my earlier above identified applications, the arrangement is such that when the liquor in the still has boiled down to a certain concentration the thermostat means effects movement of the transfer valves to connect the bottom of the transfer chamber, filled with rich liquor drawn from the absorber, to the top of the still through the pipe 35, the heat exchanger here identified in general as 36, the jacket 37 around the thermostat bulb, and the pipe 38 which opens into the analyzer tower. Rich liquor thus flows down over the baffles in the analyzer tower 18, in direct contact with outgoing refrigerant vapor, to the top of the body of liquor in the still. Pressure equalization, to enable this flow, is attained by simultaneously connecting the top of the transfer chamber 31 to the high pressure vapor above the still.

As soon as the incoming relatively cool rich liquor has sufficiently cooled the thermostat means, the valves are thrown back to a position connecting the bottom of the transfer chamber 31 to the absorber, through the pressure chamber and the rising leg 26 of the absorber loop; and at the same time the high pressure vapor in the transfer chamber is absorbed, in the pressure chamber, to drop the pressure to or below that in the absorber. There is then a flow of rich liquor from the absorber to the transfer chamber to refill it. As soon as the liquid level in the absorber starts to drop a float valve therein opens to permit weak liquor from the bottom of the still, under still pressure, to pass up the tube 39, through the heat exchanger 36, to maintain the desired liquid level in the absorber and still.

It will thus be seen that, at appropriate intervals, there is intermittent flow of rich liquor to the top of the still, and of weak liquor from the bottom of the still to the absorber, these flows being in heat exchange relationship with each other. Despite the constant boiling off of refrigerant vapor in the still, therefore, and absorption of such vapor in the absorber, desired quantities and concentrations of liquor can be maintained in each of these.

The rate of transfer and rate of refrigerant vapor creation is a direct function of the amount of heat supplied to the still, and thus of the amount of fuel flowing to the burner.

Regulation of the rate of cooling can thus be effected by regulation of fuel flow. The vertical arrangement of the still and analyzer, to the back of and beneath the food compartment, makes a particularly compact arrangement of parts without any loss in efficiency. Maintaining a difference in concentration between the top and bottom of the body of liquor in the still, and the use of an analyzer tower so that incoming rich liquor passes in intimate relationship with outgoing vapor, enables withdrawal of weak liquor from the bottom of the body of liquor and supply of rich liquor to the top thereof without disturbance in the operation of the still to any substantial extent. Use of an absorption cooling coil in connection with the absorber chamber, and location of this coil and the condenser coil at the very bottom of the machinery compartment at the bottom of the cabinet, open to atmosphere and in the path of a flow of air through the machinery compartment and up behind the food compartment, results in most effective cooling of these coils merely by air.

Referring first to the construction of the still and analyzer tower, particularly as shown in Figures 4, 5 and 5A, it will be seen that the still 16 comprises a vertical cylindrical vessel divided into vertical strata by a plurality of horizontally extending baffle plates 40. As may be best seen in Figure 8, the baffle plates 40 do not cover the complete horizontal area of the cross section of the still in which they lie, the baffle here being shown with a hole or opening 41 therethrough. As may be best seen in Figure 5, these openings are staggered, so that, while there can be movement of liquid from the top to the bottom of the still, any circulation in the body of liquid is substantially completely prevented.

Extending up from the top of the still is the analyzer tower or tube 18. This tube surrounds the flue 42 and is also provided with baffles, here identified as 43, with staggered openings 44 therethrough. As may be best seen in Figures 5, 5A and 7, these baffles are more widely spaced in the upper part of the analyzer tower, above the point where the tube 38 enters it.

Incoming rich liquor drops on the first baffle immediately beneath it, on entering the analyzer tower, then has to flow across each succeeding lower baffle to reach the alternately staggered opening. Outgoing refrigerant vapor has to follow the same zigzag path, so that the rich liquor is raised considerably in temperature before it enters the main body of liquor in the still, desirable from the standpoint of efficiency; and outgoing refrigerant vapor has much of the entrained water removed from it before it leaves the analyzer tower.

When the rich liquor reaches the main body of liquor it tends to remain on the top thereof because of the hindrance to circulation imposed by the baffles 40. Were it not for the baffles, convection and the vapor bubbling up through the liquid would cause turbulence and circulation substantially equalizing the concentration throughout the still. The presence of the baffles, however, tends to prevent this circulation, so that the liquor removed from the still at the bottom thereof and delivered to the absorber at intervals is considerably lower in concentration than would otherwise be the case.

As can be best seen in Figures 4 and 5, the flue 42 opens at its lower end into a transverse or horizontal conduit, here shown in what may be termed Venturi shape, the burner 15 projecting the flame into one end of this transverse tube. The flame and the products of combustion tend to transfer their heat in the major part to the liquid in the still 16; but the products of combustion passing up the flue 42 are still quite hot. The use of a vertical still and the provision of an elongated analyzer tower above the still enables good transfer of the heat in the flue gas to the liquid in the still and analyzer tower. Each of the baffles 43 in the analyzer tower, of course, are in direct heat conductive relationship with the flue 42, so that the film of incoming rich liquor on these baffles is considerably warmed. Moreover, the provision of a long vertical flue enables removal of sufficient heat from the combustion products to enable them to be vented to atmosphere at the top without special safety precautions which might otherwise be necessary, as for example an outside flue.

The positioning of the analyzer tower and flue to the back of the vertical cylindrical still, and the use of a machinery compartment beneath the food compartment in the cabinet, enables the major bulk of the still to be located in the machinery compartment without causing undue depth or extension of the back of the refrigerator; yet the desired length or height of the analyzer tower can be attained by running this relatively narrow element up the back of the refrigerator, behind the food compartment.

Referring now more particularly to Figures 1 and 2, it will be seen that the condenser and absorber cooling coils 20 and 28 are located at the very bottom of the cabinet 24, open to atmosphere, there being no bottom or partition beneath them. Air passing up through the coils passes out the back of the machinery compartment and up the back of the refrigerator, there being a continual tendency to further warm the air and accelerate its flow, so that there is a good natural draft of air with the coils at the coolest part thereof. That is, the bottom and back of the machinery compartment are open; and an inclined baffle 52, as for example of sheet metal, tends to insure a smooth upward and backward flow of air. The use of an absorber circulating coil has heretofore been known, but such coil was wound around the absorber chamber. The present construction, bringing the absorber circulating loop down to the bottom of the refrigerator cabinet, is a great improvement in that it greatly improves absorption action by dissipating far more heat of absorption than would otherwise be possible, and in that location of the coils around the absorber would result in undesired bulk behind the refrigerator. The cooling effect of the flow of air is increased with respect to both the condenser and absorber coils, of course, by providing fins.

While I have shown and described certain embodiments of my invention, it is to be understood that it is capable of many modifications. Changes, therefore, in the construction and arrangement may be made without departing from the spirit and scope of the invention as disclosed in the appended claims.

I claim:

1. A domestic refrigerator of the continuous absorption type, including: a cabinet having a food compartment and a machinery compartment therein, the machinery compartment being directly beneath the food compartment; and refrigerant circulating apparatus including an evaporator in the food compartment, heat rejecting coils in the apparatus compartment, and vapor generating apparatus partly under and partly behind the food compartment, the generating apparatus comprising a chamber having an analyzer tube of relatively small diameter and substantial length extending upwardly therefrom, part of the chamber extending into the machinery compartment and the tube being immediately adjacent the back of the food compartment and having a flue therein throughout at least the major portion of its length.

2. A domestic refrigerator of the continuous absorption type, including: a cabinet having a food compartment and a machinery compartment therein, the machinery compartment being directly beneath the food compartment; a still; a condenser comprising an air cooled coil in the machinery compartment; an evaporator in the food compartment; absorption means including an air cooled coil in the machinery compartment and a chamber at the back of the food compartment; and operative connections between the still, condenser, evaporator, and absorber.

3. A refrigerator of the character claimed in claim 2, wherein both coils are located at the bottom of the cabinet.

4. A refrigerator of the character claimed in claim 2, wherein the bottom and back of the machinery compartment are open and both coils are located adjacent the open bottom of the cabinet.

5. A domestic refrigerator of the continuous absorption type, including: a cabinet having a food compartment and a machinery compartment therein, the machinery compartment being directly beneath the food compartment; a still; a condenser; an evaporator in the food compartment; absorption means including an air cooled coil in the bottom of the machinery compartment, said bottom being open, and a chamber located outside of and above said machinery compartment; and operative connections between the still, condenser, evaporator, and absorber.

6. A domestic refrigerator of the continuous absorption type, including: a cabinet having a food compartment and a machinery compartment therein, the machinery compartment being below the food compartment; a still; a condenser; an evaporator in the food compartment; absorption means including an air cooled coil at the bottom of the cabinet, said coil being open to atmosphere, and a chamber at the back of the food compartment; and operative connections between the still, condenser, evaporator and absorber.

7. A domestic refrigerator of the continuous absorption type, including: a cabinet having a food compartment and a machinery compartment therein; a still; a condenser; an evaporator in the food compartment; absorption means including an air cooled coil at the bottom of the cabinet, the cabinet being so constructed as to permit air to flow up past said coil, and a chamber near the top of the refrigerator at the back of the food compartment; and operative connections between the still, condenser, evaporator and absorber.

JOSEPH N. ROTH.